No. 764,898. PATENTED JULY 12, 1904.
J. F. MUMFORD.
MACHINE FOR MANUFACTURING BRUSHES.
APPLICATION FILED MAR. 30, 1903.
NO MODEL. 9 SHEETS—SHEET 2.
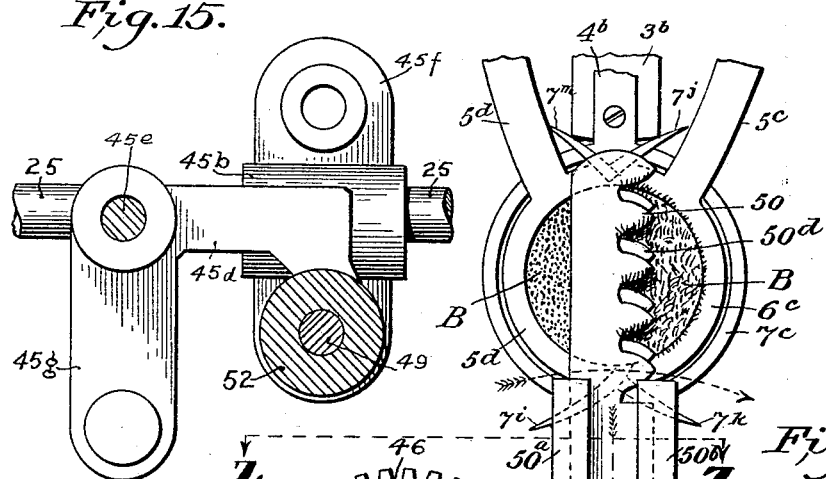
Fig. 15. Fig. 12.
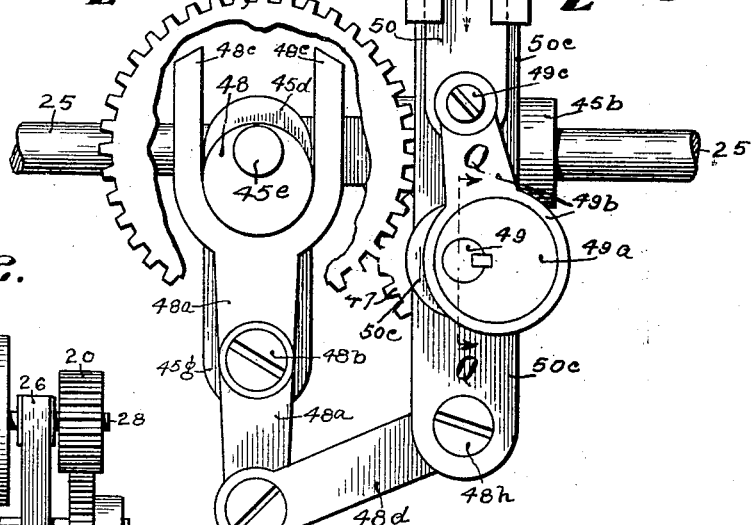
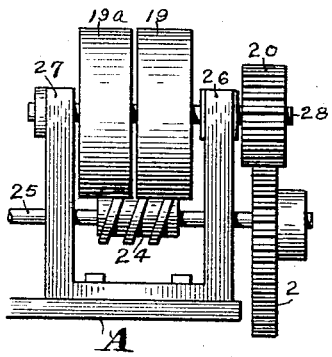
Fig. 2.
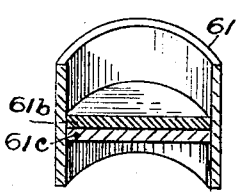
Fig. 28
WITNESSES:
John F Hoy
Joseph L. Magee
INVENTOR
Joseph F. Mumford

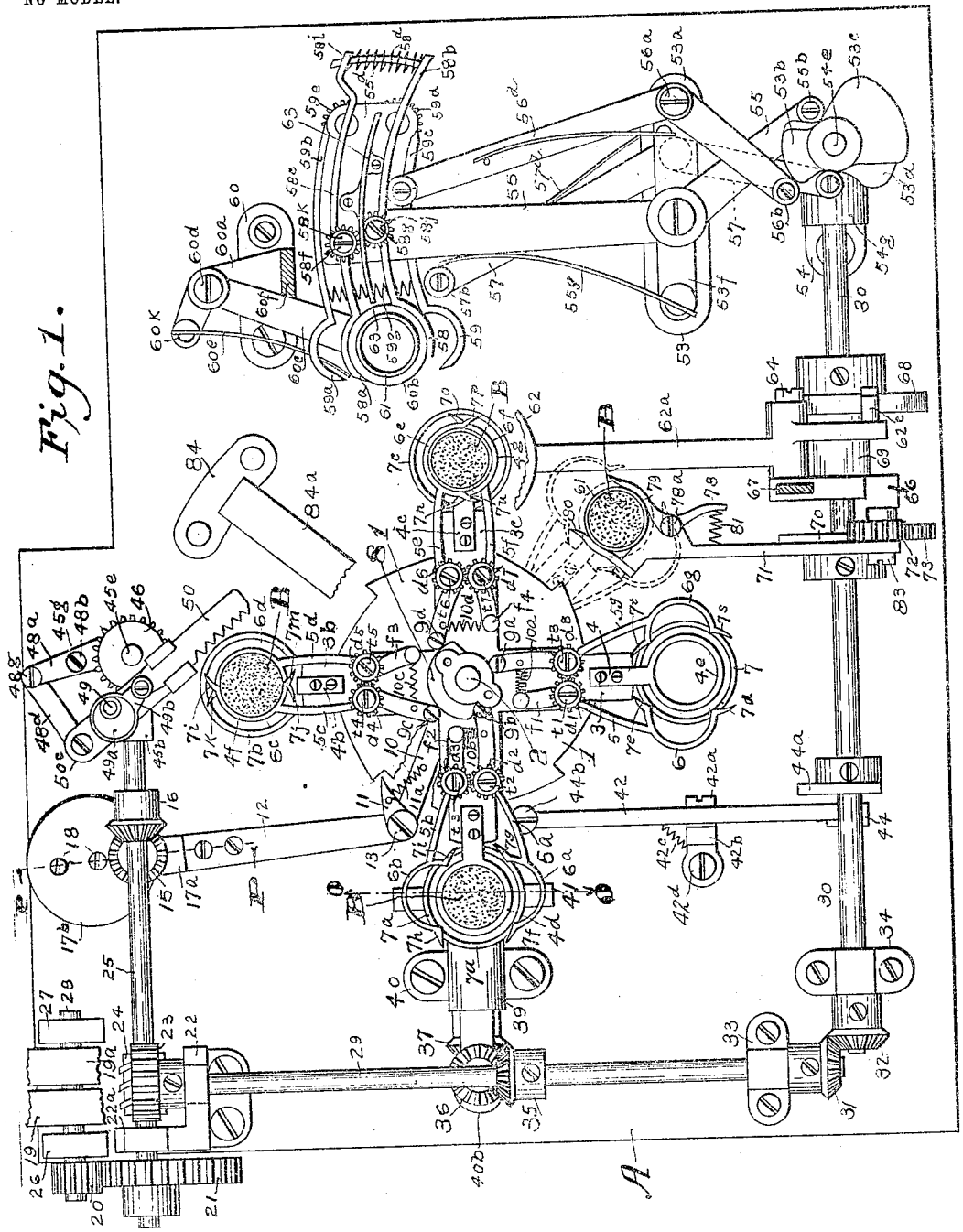

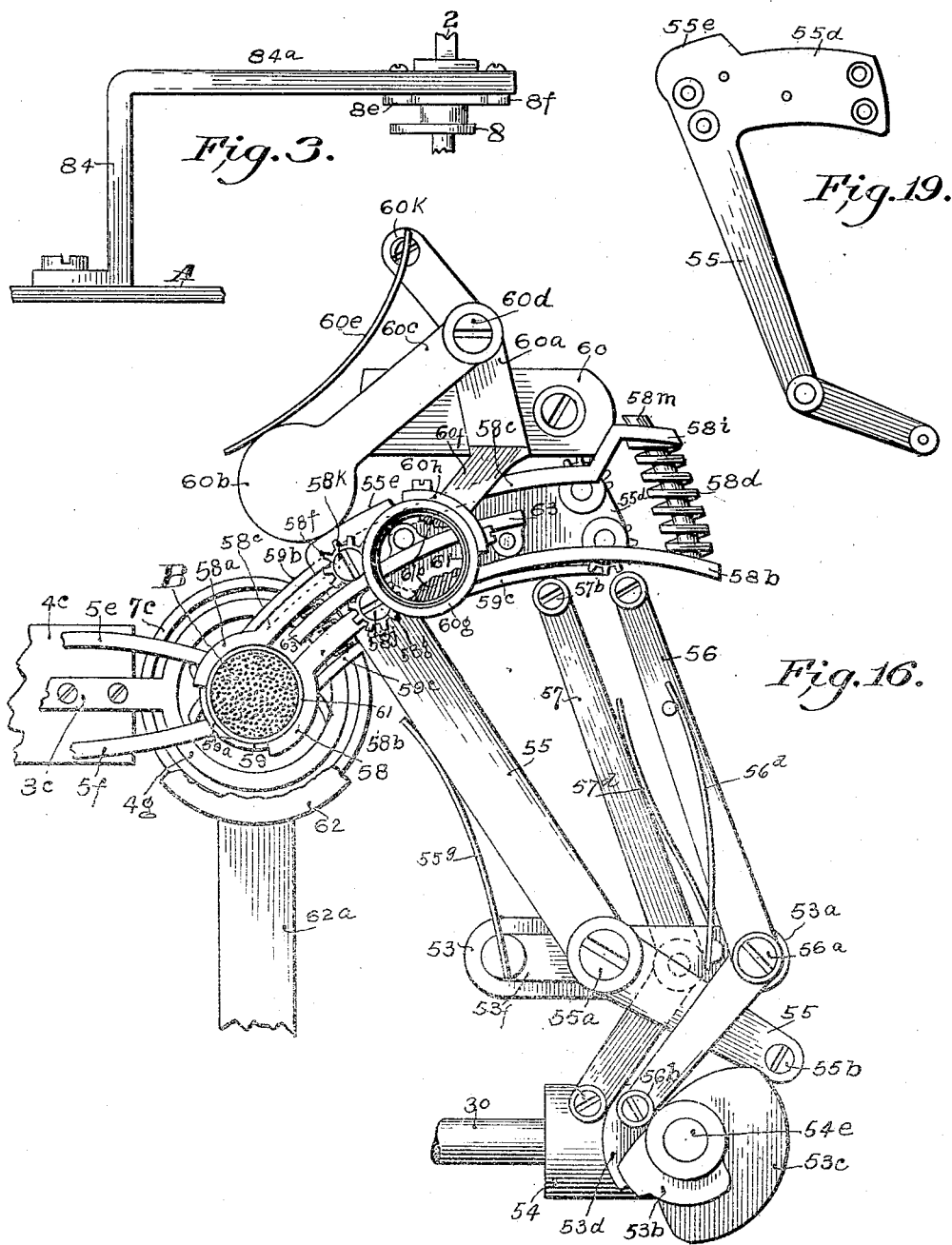

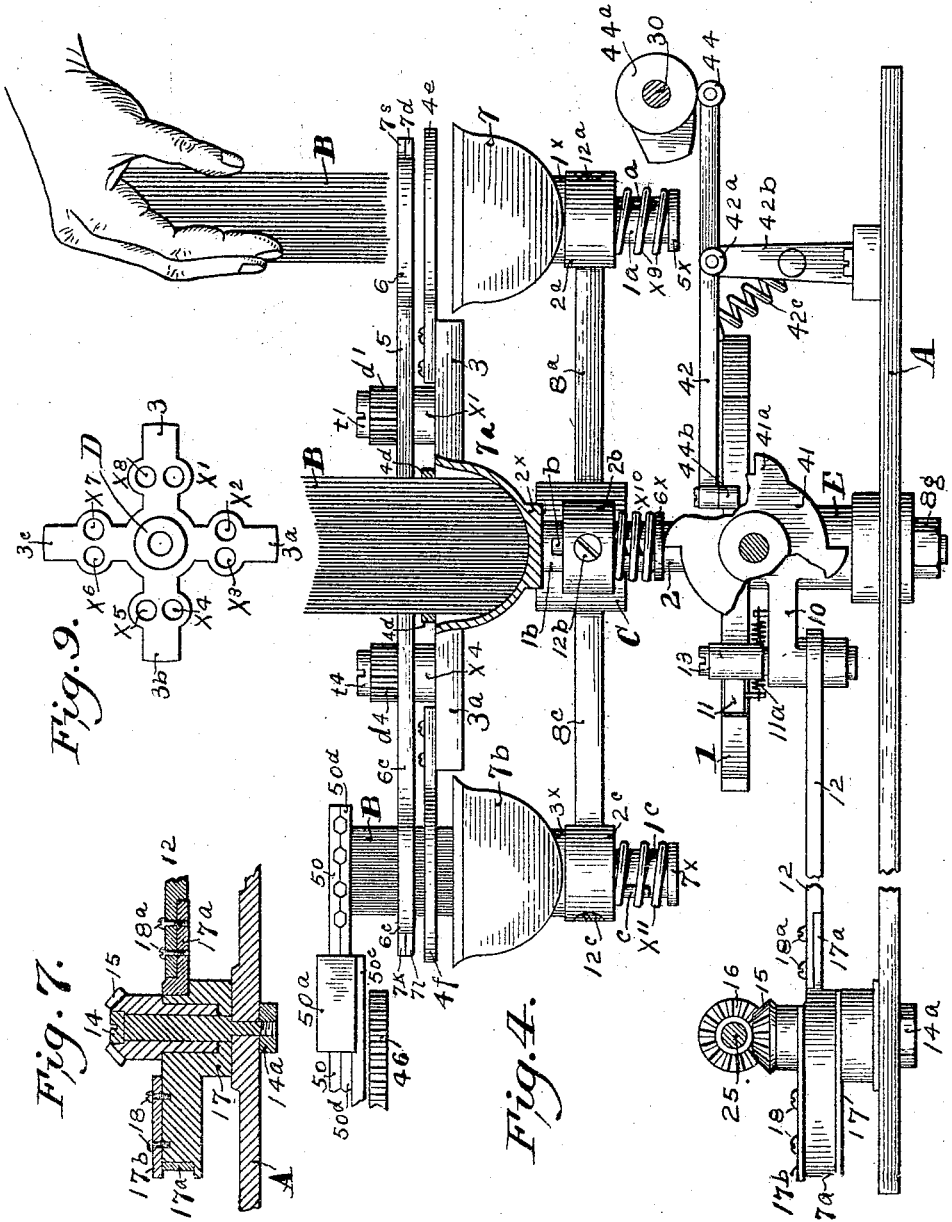

No. 764,898. PATENTED JULY 12, 1904.
J. F. MUMFORD.
MACHINE FOR MANUFACTURING BRUSHES.
APPLICATION FILED MAR. 30, 1903.
NO MODEL. 9 SHEETS—SHEET 5.
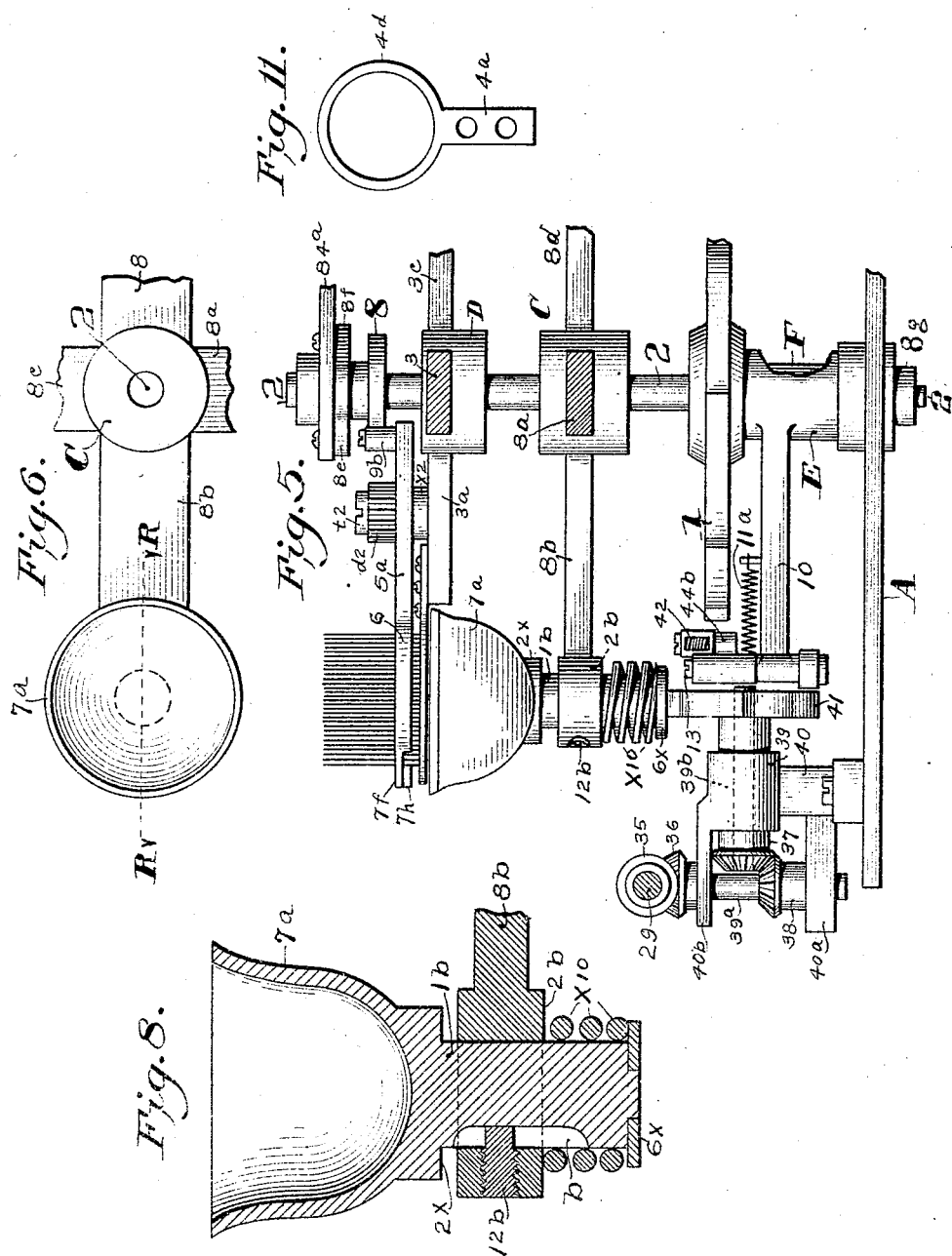

No. 764,898. PATENTED JULY 12, 1904.
J. F. MUMFORD.
MACHINE FOR MANUFACTURING BRUSHES.
APPLICATION FILED MAR. 30, 1903.
NO MODEL. 9 SHEETS—SHEET 6.
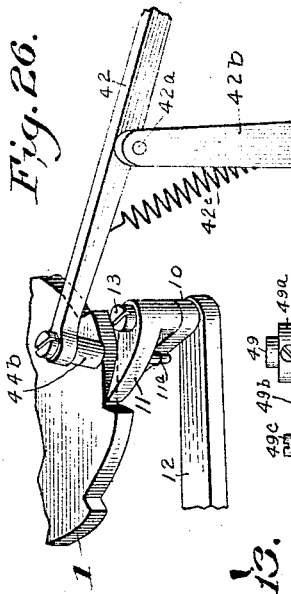
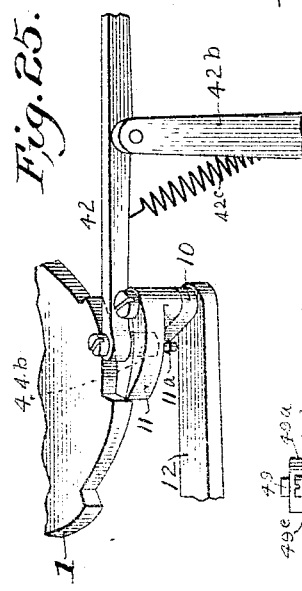
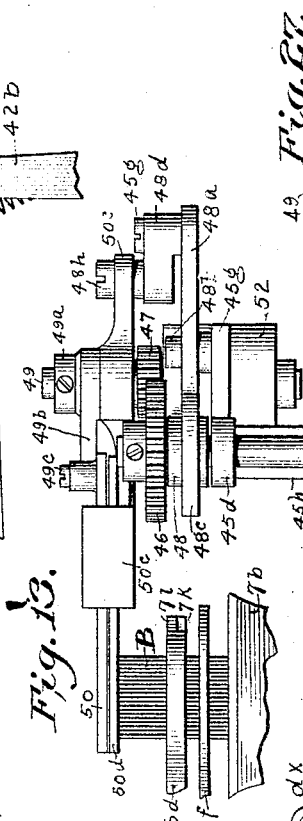
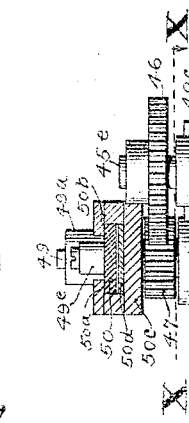
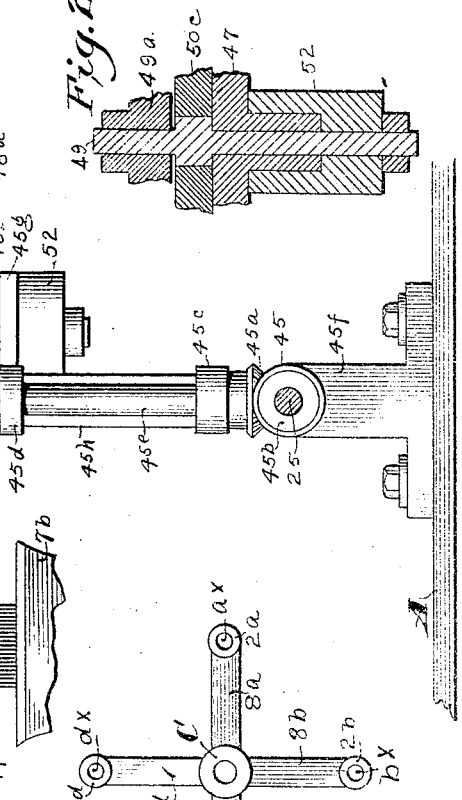
WITNESSES:
John F. Hoy
Joseph L. Magee
INVENTOR
Joseph F. Mumford

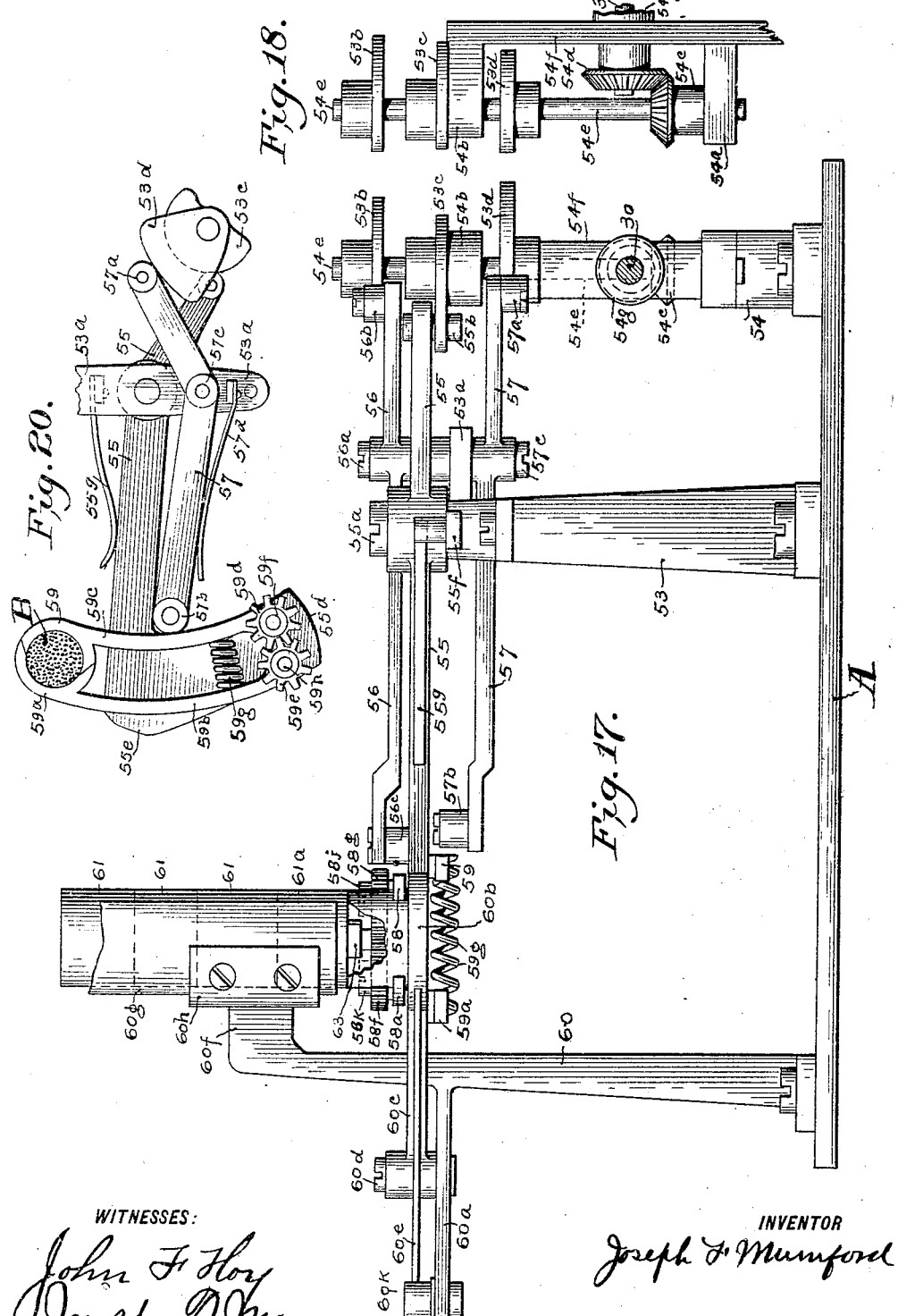

No. 764,898. PATENTED JULY 12, 1904.
J. F. MUMFORD.
MACHINE FOR MANUFACTURING BRUSHES.
APPLICATION FILED MAR. 30, 1903.
NO MODEL. 9 SHEETS—SHEET 8.
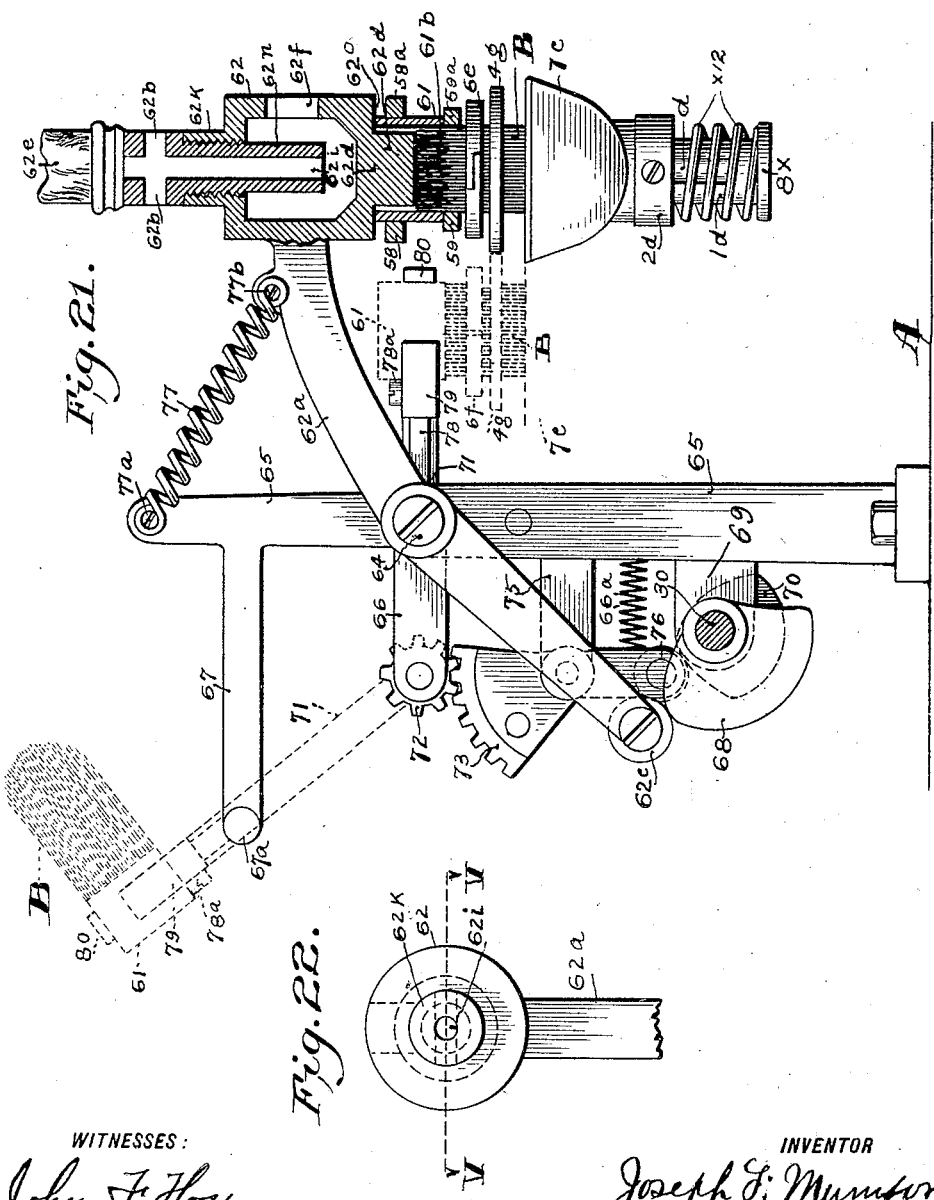
WITNESSES:
John F Hoy
Joseph F Magee
INVENTOR
Joseph F. Mumford No. 764,898. PATENTED JULY 12, 1904.
J. F. MUMFORD.
MACHINE FOR MANUFACTURING BRUSHES.
APPLICATION FILED MAR. 30, 1903.
NO MODEL. 9 SHEETS—SHEET 9.
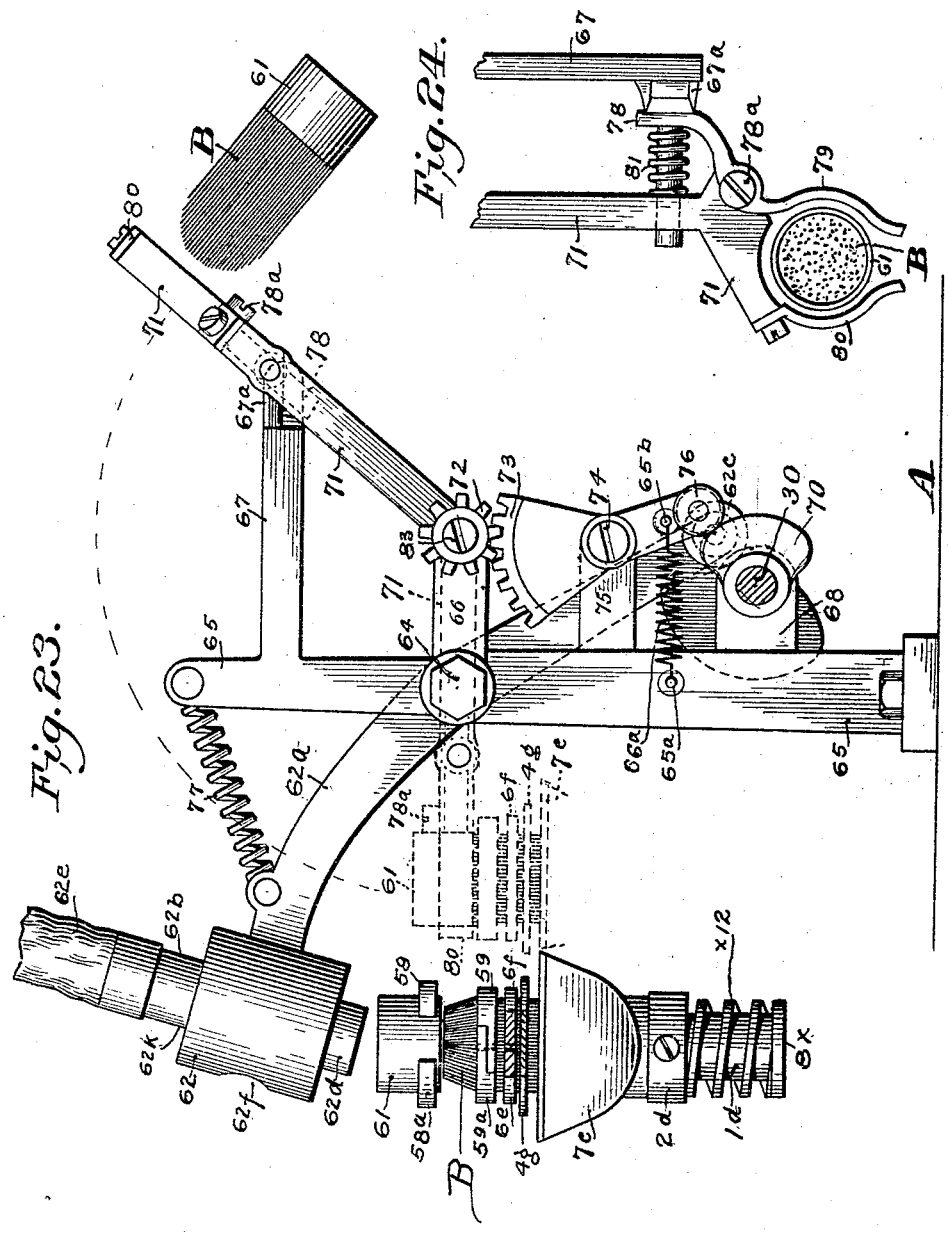
WITNESSES:
John F Hoy
Joseph D Magee
INVENTOR
Joseph F. Mumford No. 764,898. Patented July 12, 1904.

UNITED STATES PATENT OFFICE.

JOSEPH F. MUMFORD, OF PHILADELPHIA, PENNSYLVANIA.

MACHINE FOR MANUFACTURING BRUSHES.

SPECIFICATION forming part of Letters Patent No. 764,898, dated July 12, 1904.

Application filed March 30, 1903. Serial No. 150,337. (No model.)

*To all whom it may concern:*

Be it known that I, JOSEPH F. MUMFORD, a citizen of the United States, residing in the city of Philadelphia, county of Philadelphia, and State of Pennsylvania, have invented new and useful Improvements in Machines for Manufacturing Brushes, which improvements are fully set forth in the following specification and accompanying drawings.

The object of my invention is to provide a machine for the manufacture of brushes which will automatically shape and compress a knot or tuft of bristles or brush-fiber, the "brush-knot" or "tuft," as it is technically termed, being supported and automatically shaped in a movable brush-shaping cup, the said cup in its movements shaking and agitating the bristles or stock composing the brush and causing the end confined therein to assume a shape or contour similar to the interior of the cup, to compress the shaped brush-knot and trim the outwardly-extending end thereof, to apply a ferrule to the end of the trimmed brush-knot and melt an adhesive and metallic alloy contained within the ferrule, so that the adhesive and alloy will envelop and bind the brush-knot contained within the ferrule, the brush being then ejected from the machine.

Generally stated, my improved machine, considered in its entirety, comprehends, first, a plurality of movable automatic brush-shaping cups; second, mechanism to clamp and hold the shaped brush-knot; third, mechanism to trim the outward end of said shaped and clamped brush-knot; fourth, mechanism to convey cement-supplied ferrules to the trimmed brush-knot; fifth, mechanism to apply supplemented pressure to the trimmed brush-knot; sixth, mechanism to apply the cement-supplied ferrules to the brush-knot and melt by heat the cement or adhesive therein; seventh, mechanism to eject the formed brush from the machine; eighth, mechanism to advance the brush-shaping cups and brush-knot clamps and brush-knots; ninth, means to regulate the said advancing movement; tenth, mechanism to lift and impart a succession of shocks to said brush-shaping cups. All the aforesaid devices are conjunctively operated in the working of the machine.

Referring to the drawings, Figure 1 is a top plan view of a good embodiment of my machine. Fig. 2 is a rear elevation of the driving-gear and a portion of a worm and shaft. Fig. 3 is a side elevation of a shaft and cam-supporting stand with the cam affixed thereto. Fig. 4 is an elevation, partly in section, of the brush-shaping cups and cup-reciprocating cams, the ratchet-pawl and ratchet, the eccentric and eccentric driving-gear, the eccentric and ratchet-pawl levers, section of cup being taken on the dotted line O O, Fig. 1. Fig. 5 is a side elevation, partly in section, of one of the brush-shaping cups, the cup-supporting arm, the brush-guiding ring, one of the brush-knot clamps, a portion of the shaft-supporting arm, the cup-reciprocating cam and supporting-stand, the pawl-shifting roller and lever, the ratchet, the ratchet controlling and supporting devices, the brush-cup, and clamp-supporting arms. Fig. 6 is a top plan view of one of brush-shaping cups and supporting-arm and hub. Fig. 7 is a sectional view of an eccentric on the sectional line P P, Fig. 1. Fig. 8 is an enlarged sectional view of one of the brush-shaping cups, a portion of the cup-supporting arm, section being taken on the dotted line R R of Fig. 6. Fig. 9 is a plan of the brush-clamp and guiding-ring-supporting arms. Fig. 10 is a plan of the brush-shaping cup-supporting arms. Fig. 11 is a plan of a brush-guiding ring. Fig. 12 is an enlarged top plan of a brush-trimming device. Fig. 13 is a side elevation of the parts shown in Fig. 12. Fig. 14 is a front elevation, partly in section, of the parts shown in Fig. 13, section being taken on the dotted line Z Z, Fig. 12. Fig. 15 is a sectional plan of the trimming-stand on sectional line X X, Fig. 14. Fig. 16 is an enlarged plan view of devices to supply and convey brush-ferrules and brush-knot clamps. Fig. 17 is a side elevation of the parts shown in Fig. 16 with the brush-cup and brush-knot omitted. Fig. 18 is a side elevation of a portion of Fig. 17, including a series of cams and cam-supporting stand. Fig. 19 is a plan of a swinging bell-crank lever adapted to support ferrule-conveying and brush-compressing devices. Fig. 20 is an inverted plan of the swinging lever with subcompressing-clamps thereon. Fig. 21 is an elevation, partly in section, of a ferrule-applying and cement-melting device, section being taken on the dotted line V V, Fig. 22. Fig. 22 is a plan of a combustion-chamber. Fig. 23 is an elevation of Fig. 21 on the side, showing a brush-ejector. Fig. 24 is an enlarged plan of a brush-ejector clamp and clamp-opening arm. Figs. 25 and 26 are perspective views of a ratchet-pawl-shifting device in different positions. Fig. 27 is a sectional view of a portion of Fig. 14 on the dotted line Q Q of Fig. 12. Fig. 28 is a sectional perspective view of an adhesive and alloy supplied brush-ferrule.

In the organization of my improved machine, as shown in the accompanying drawings, the operative parts are mounted upon and connected with a suitable bed or plate, (designated A,) which may be of any convenient form, provided it serves to support the operative parts in position.

Referring to the drawings, A designates the table-top of the machine, to which is secured a stand having two upright shaft-bearings 26 and 27, the bearings supporting the main driving-shaft 28. Mounted upon said shaft 28 are two pulleys, one, 19, being fast, the other, $19^a$, being loose. On one end of shaft 28 a pinion-gear 20 is securely keyed. Secured to the table A is a stand and bearing 22, having an extended bracket $22^a$, forming a bearing for a shaft 25, said shaft being further supported by a bearing $45^b$. A large gear 21, having a hub, is fastened by said hub to the end of shaft 25, so that said gear will mesh with the pinion 20, which is mounted in the bearings over it. Fig. 2 is a rear elevation of the driving-gear.

33 and 34 are similar stand-bearings, also secured to the table A, the stand 33 forming a bearing for one end of a shaft 29, the other end being journaled in the stand 22. 30 is also a shaft journaled in the bearings 34 and $54^g$. (See Figs. 1, 17, 18, and 21.)

31 and 32 designate intermeshing miter-gears on shafts 29 and 30.

24 designates a worm secured to the shaft 25, said worm meshing with a worm-gear 23, which is secured to the shaft 29, said worm-gear being over and above the worm 24, the function of said worm and gear being to impart motion to the shaft 29. (See Figs. 1 and 2.)

2 represents a vertical shaft having a bearing in the table A and overhanging bearing $84^a$, the bearing being partly cut away in Fig. 1, so as to show other working parts more clearly. The lower end of the shaft 2 runs in the table A and has a shoulder turned thereon to support said shaft, a collar $8^g$ being fastened to the portion projecting under the table.

1 designates a large ratchet having teeth cut at regular intervals in its face, the number, as shown in Fig. 1, being eight teeth, said ratchet being further provided with a hub F, Fig. 5, which also forms a convenient bearing for a pawl-lever 10.

11 is a pawl secured to the lever 10 by the stud-screw 13, the pawl being held against the ratchet-teeth by the spring $11^a$. (See Figs. 1, 4, and 25.)

17 represents an eccentric which is guided and supported by the large stud-bolt 14, said bolt being secured through the table A by the nut $14^a$, the eccentric being driven by the gear 15, which meshes with a similar gear 16, which is secured to the driving-shaft 25, (see Figs. 1 and 4,) the gear 15 having a long hub with an annular shoulder turned thereon, the gear-hub being forced into the eccentric sufficiently tight to turn same.

$17^a$ designates a strap around the eccentric, to the extended end of which is attached, by means of screws $18^a$, the supplemental eccentric-rod 12, said eccentric-rod being also secured to the pawl-lever 10 by the stud 13. (See Figs. 1, 4, and 7.) A plate $17^b$ is secured to the eccentric to keep the strap in place by means of the screw 18, sufficient play being given for free working. (See sectional view in Fig. 7.)

The brush-shaping cups 7 $7^a$ $7^b$ $7^c$ are supported and guided by the radial arms $8^a$ $8^b$ $8^c$ $8^d$, which arms project laterally from and are a part of the hub C, which is fastened to the ratchet-shaft 2. The outer ends of the arms are provided with bearings having bosses thereon, through which bearings the apertures or holes $a^x$ $b^x$ $c^x$ $d^x$ are bored and through which apertures the cup-stems move, the bosses being finished on the top or cup side, so as to form a convenient seat for the said cups. (See Figs. 4, 5, 6, 8, and 10.) The brush-shaping cups are each provided with a guiding-stem projecting from the bottom of each cup, which stems are designated as $1^a$ $1^b$ $1^c$ $1^d$. The stems are turned round and smooth to a shoulder on each cup, (designated $1^x$ $2^x$ $3^x$ $4^x$,) the shoulders being also turned true and smooth, so as to seat neatly on the finished bosses of the arm-bearings. The cup-stems are also provided with the keyways $a$ $b$ $c$ $d$, and the arm-bearings have the keys $12^a$ $12^b$ $12^c$ $12^d$, screwed in the sides thereof, so that the said keys will project laterally into the keyways of the cup-stem sufficiently to keep the cups from turning around or sidewise. The bottom of the cup-stems are provided with the collars $5^x$ $6^x$ $7^x$ $8^x$, which are riveted thereto, so as to support and retain the opposing springs $x^9$ $x^{10}$ $x^{11}$ $x^{12}$. (See Figs. 4, 5, 6, 8, 10, and 21.) It should be here stated that the cup-stems have a free-working fit in the stem-hole in the supporting-bearings. The enlarged sectional view in Fig. 8 shows more clearly the key $12^b$ in the cup $7^a$, the key $12^b$ being screwed through the bearings $2^b$ and projecting into the said keyway. The cup-stem $1^b$ is shown as having a shoulder on the bottom thereof, so as to permit the collar $6^x$ to be riveted thereto and lie flush to the bottom of the stem, the coil-spring $x^{10}$ being placed on the stem, so as to exert considerable tension against the collar and under side of the supporting-bearings $2^b$, and thus oppose the upward movement of cup-stem and cup, but acting reversely as means to draw the cup down again, so that the cup-seat $2^x$ will strike the top side of the boss, which forms its support, with a sharp blow or impingement.

Secured to the shaft 2, but above the brush-cup-supporting arms, is the hub D, having the four radial arms 3 $3^a$ $3^b$ $3^c$, projecting laterally therefrom, the said arms being shorter than the cup-supporting arms and provided on the top sides thereof with the finished bosses $X'$ to $X^8$—that is, two bosses on each arm, (see plan in Fig. 9)—the said four arms supporting four pairs of brush-clamping levers, each boss supporting a lever. (See Figs. 5 and 9.)

The brush-knot-clamping levers 5 $5^g$ $5^a$ $5^b$ $5^c$ $5^d$ $5^e$ $5^f$, with the small plain gears $d'$ to $d^8$ rigidly secured thereto, are fulcrumed and move pivotally on the shoulder-screws $t'$ to $t^8$, which are fastened into the bosses of the arms 3 $3^a$ $3^b$ $3^c$, so that the gears will intermesh in pairs, as in Fig. 1, the gears $d'$ $d^8$ on the levers 5 $5^g$, gears $d^2$ $d^3$ on levers $5^a$ $5^b$, gears $d^4$ $d^5$ on levers $5^c$ $5^d$, gears $d^6$ $d^7$ on levers $5^e$ $5^f$, respectively. On the outer end of each clamping-lever a brush-clamp is secured, and these are designated in the following order: the brush-clamp 6 to the clamping-lever 5, clamp $6^a$ to lever $5^a$, clamp $6^b$ to lever $5^b$, clamp $6^c$ to lever $5^c$, clamp $6^d$ to lever $5^d$, clamp $6^e$ to lever $5^e$, and clamp $6^f$ to lever $5^f$, clamp $6^g$ to lever $5^d$. (See Figs. 1, 4, 5, and 12.) It will be seen that the clamping-levers $5^g$, $5^a$, $5^c$, and $5^e$ extend inwardly from the gears or pivotal point and have thereon the cam-rollers $9^a$ $9^b$ $9^c$ $9^d$. The levers 5, $5^b$, $5^d$, and $5^f$ also have short extensions inwardly from their pivotal point (designated $f'$ $f^2$ $f^3$ $f^4$) to these ends, and a portion of the opposite levers, the clamp-opening springs $10^a$ $10^b$ $10^c$ $10^d$, are attached. The brush-knot clamps, it will be seen in Figs. 1, 4, and 5, are placed over and in alinement with the brush-shaping cups, so that they will be central with the cup centers, the said cups being shown in this case to be of circular shape. The clamps are obviously of the same form, but smaller. The brush-clamps are further provided with what I call "brush-collecting" spurs or tangents, a pair on each clamp, in the following order: clamp 6, tangents $7^e$ $7^d$; clamp $6^a$, tangents $7^g$ $7^f$; clamp $6^b$, tangents $7^h$ $7^i$; clamp $6^c$, tangents $7^j$ $7^m$; clamp $6^d$, tangents $7^j$ $7^k$; clamp $6^e$, tangents $7^o$ $7^n$; clamp $6^f$, tangents $7^n$ $7^q$; clamp $6^g$, tangents $7^s$ $7^t$, (see Figs. 1, 4, and 5,) the tangents extending outwardly from the diametral line of the clamps, so as to embrace all the loose brush-stock B, when the clamps are moved inwardly to close, and when closed the tangents will overlap. (See Figs. 1, 4, 5, and 21.)

Secured to the table is a stand 40, said stand having the single horizontal shaft-bearing 39 and the lateral bearings $40^a$ and $40^b$. A vertical shaft $39^a$ runs in these bearings. To the top end of this shaft a miter-gear 36 is secured and intermeshes with a similar gear 35, secured to the shaft 29, also secured to the shaft $39^a$. Above the bearing $40^a$ is another miter-gear 38, which intermeshes with and turns the gear 37, said gear 37 being secured to the horizontal shaft $39^b$, which runs in the single bearings 39 in the stand 40. On the inner end of the shaft $39^b$ and beneath the stem of the brush-shaping cup a cam-carrying wheel 41 is secured, said wheel having a plurality of cam-surfaces projecting from the face thereof, the said cam projections being adapted in their rotation to alternately lift one of the brush-shaping cups when the cup is in vertical alinement therewith, the cam-surfaces contacting with the collared end of the cup-stem and raising said stem and brush-shaping cup to the full height of said projections and causing the top of said brush-shaping cup to strike the under side of the stem of the brush-guiding ring $4^e$, as shown in Fig. 5, the opposing tension of the spring $X^{10}$ pulling the cup down again to the arm-bearing seat with a sharp blow or impingement. When the cup-stem is released from the cam projection, the lifting and dropping movement thus imparted to the cup and stem will cause the knot of loose brush-stock B, confined within said brush-shaping cup, to be agitated and settled to the inner shape of the cup. (See Figs. 4, 5, and sectional Fig. 8.)

The pawl-shifting lever 42 is fulcrumed on the shoulder-screw $42^a$, which is fastened to the upper side of the stand $42^b$. On the under side of the lever end, projecting inwardly, a shifting roller $44^b$ is secured, the said roller being adapted to contact and roll against the inner side of the ratchet-pawl 11 during a portion of its extreme inward movement and by the contact thus secured to keep the pawl from engaging the ratchet-teeth for a definite number of its reciprocating movements, the retaining-spring $42^c$, secured to the lever and stand, keeping the lever and roller $44^b$ down and in operative contact with the said pawl 11, a lever-lifting cam $44^a$ on the cam-shaft 30 contacting with the cam-roller 44 on the outer end of the lever 42 and raising said lever and pawl-shifting roller $44^b$ above and out of line of movement of said pawl and allowing the pawl to engage successively two teeth of the ratchet-wheel and advance said ratchet one-quarter of its complete revolution and no more, and thus move the brush-shaping cups and brush-knots to the various operative parts of the machine, the cam then permitting the spring to draw the lever 42 and pawl-shifting roller 44$^b$ down to operative contact with said pawl again and hold same for another definite period. These movements are illustrated by the Figs. 25 and 26. In Fig. 25 the pawl-shifting roller 44$^b$ is shown as operating against the pawl 11 and shifting said pawl from engaging a tooth of the ratchet 1. Fig. 26 shows the pawl-shifting roller and lever lifted above and out of operative contact with said pawl, thus permitting the retaining-spring 11$^a$ to draw the pawl 11 into and engage a tooth of said ratchet and advance same to a definite point. (See Figs. 1, 4, 5, 25, and 26.)

The stand 45$^f$ is securely fastened to the table A, said stand having the shaft-bearing 45$^b$, supporting the driving-shaft 25. On the upright 45$^h$ of said stand are two projecting shaft-bearings 45$^c$ and 45$^d$. A vertical shaft 45$^e$ runs in the said bearings. On the bottom of said shaft is a miter-gear 45$^a$, which intermeshes with a similar gear 45, secured to and rotating on the shaft 25. (See Fig. 14.) On the top end of the shaft 45$^e$, which extends above the arm 45$^d$, a plain gear 46 is secured. (See Figs. 1, 12, 13, and 14.) The small vertical shaft 49 runs in the single vertical bearing 52, which is a part of the stand-upright 45$^h$, Figs. 14, 15, and sectional plan 27. A small gear 47 is fastened to the shaft and intermeshes with and receives motion from the gear 46, which is fastened to the shaft 45$^e$, Figs. 14 and 15.

Over the gear 47 and on the shaft 49 is a shear-bearing lever 50$^c$, said lever oscillating on the said shaft, which forms a convenient bearing for the lever, the said lever having a long and short extension from its oscillating center, the longest or inward end being adapted to support a rigid brush-shear 50$^d$, Figs. 1, 12, 13, 14. Above the shear 50$^d$ are the guiding-grooves 50$^a$ and 50$^b$, in which reciprocates the top or membering shear 50, (see section in Fig. 14; see Figs. 1, 12, 13, 14,) the two shears having a shearing or membering fit and overlapping each other. Securely fastened to the said shaft 49 is a small eccentric 49$^a$. An eccentric-strap and link 49$^b$ works reciprocally on said eccentric, the end of the link 49$^b$ working on the shoulder-screw 49$^c$, which is fastened in the top of the shear 50.

On the shaft 45 above the lateral bearing 45$^d$ an eccentric 48 is secured. A link lever 48$^a$ is fulcrumed in another extension 45$^g$ of the stand-upright 45$^h$. The inner end of the lever is provided with the yokes 48$^c$ and are in alinement with the eccentric 48, said eccentric being adapted to move the lever and laterally oscillate same. (See Figs. 1, 12, and 13.) The short or outwardly-extending end of the shear-bearing lever is connected with the outer end of the yoked lever by the link 48$^d$, Figs. 1, 12, and 13, and works freely thereon over the shoulder-screws 48$^h$ 48$^g$, the moving eccentric 48 imparting, through the lever 48$^a$ and connecting-link 48$^d$, an oscillating movement to the shear-bearing lever and shears, the intermeshing gears 46 and 47 imparting motion to the eccentric 49$^a$ and link 49$^b$ and reciprocating the shear 50 over the stationary shear 50$^d$, the shear-bearing lever 50$^c$ working freely on the shaft 49 and causing the link and strap 49$^b$ to slip on the eccentric 49$^a$ as said lever oscillates the shears across the brush-top, the shear 50 being understood as always in motion and clipping all straggling hairs that pass within the cutting edges of the said shears, as in Fig. 12. The section in Fig. 27 shows the position occupied by the shaft 49, which extends through the bearing 52, the gear 47 having a long hub, which projecting well into the bearing forms a convenient support for itself and the shaft 49, to which it is fastened, the said shaft having a shoulder thereon to give a broader bearing for the shear-bearing lever 50$^c$ to oscillate freely, the eccentric 49$^a$ being secured above said lever.

Secured to the table A is a vertical stand 53, said stand having a lever-supporting arm 53$^a$ extending therefrom, the top of the stand being adapted to hold and support a swinging bell-crank lever 55, the longest or inwardly-extending end of the lever being provided with a flat side extension 55$^d$, the said extension forming a bearing to support on its top side a pair of ferrule-clamping levers 58$^b$ 58$^c$. On the short and outwardly-extending end of said lever 55 a cam-roller 55$^b$ is secured. (See Figs. 1, 16, 17, and 19.)

A shaft and cam supporting stand 54 is secured to the table A and adapted to support the cam-shaft 30. An upright 54$^f$ extends vertically from said stand and is provided with two lateral shaft-bearings 54$^a$ 54$^b$. A cam-shaft 54$^e$ runs in these bearings. A miter-gear 54$^c$ is secured to the said shaft and intermeshes and turns with a like gear on the shaft 30. (See Figs. 1, 16, 17, and 18.)

A pair of small plain gears 58$^f$ 58$^g$ are secured to the ferrule-clamp levers 58$^b$ 58$^c$, said gears intermeshing and being fulcrumed and moving the levers pivotally on the shoulder-screws 58$^j$ 58$^k$, which are fastened in the top of said lever 55. (See Figs. 1, 16, and 17.)

On the short inwardly-projecting end of the clamp-lever 58$^b$ a ferrule-clamp 58 is secured and likewise a clamp 58$^a$ on the lever 58$^c$, the clamps being of circular form, but not entirely encompassing the brush-ferrule 61. (See Fig. 16.)

Between the outwardly-projecting ends of the clamping-levers 58$^b$ 58$^c$ a spring 58$^d$ is placed, the spring being supported and guided by the curved pin 58$^m$, one end of which is fastened in the lever 58$^b$, the other end moving loosely through an aperture in the lever 58$^c$, it being extended by the return 58$^i$, the function of the spring being to press the levers outwardly and close the ferrule-clamps 58 58ª sufficiently tight to grip and convey a brush-ferrule.

A lever 56 is fulcrumed and moves pivotally on a shoulder-screw 56ª, which is fastened in the stand-arm 53ª. A cam-roller 56ᵇ is secured to the outward or short end. A rotating cam 53ᵇ on the shaft 54ᵉ is adapted to wipe against said roller 56ᵇ and cause the lever 56 to be pressed against the ferrule-clamp lever 58ᵇ, so as to open the clamps when desired, a spring 56ᵈ controlling and keeping the roller 56ᵇ at all times against the cam. (See Figs. 1, 16, and 17.) In Fig. 1 the clamps are shown opened by the lever 56 pressing against the clamp-lever 58ᵇ, so as to admit a brush-ferrule within the clamps. In Fig. 16 the said lever does not influence the clamps, which are closed over the ferrule 61 by the spring 58ᵈ.

The subcompressing clamping-levers 59ᵇ 59ᶜ have the small plain gears 59ᵈ 59ᵉ secured to the ends thereof and move pivotally on the shoulder-screws 59ᶠ 59ʰ, the said screws and levers being secured to and working on the under side of the extension 55ᵈ of the lever 55. A spring 59ᵍ is secured to the inner sides of the levers 59ᵇ 59ᶜ, so as to keep the levers apart when not otherwise influenced. On the end of the said levers the brush-subcompressing clamps 59 59ª are secured, the clamp 59 on the lever 59ᶜ, the clamp 59ª on the lever 59ᵇ. (See Fig. 20.)

A lever 57 is fulcrumed and moves pivotally on the shoulder-screw 57ᶜ and has a clamp-lever roller 57ᵇ on the inner end thereof. A cam-roller 57ª is attached to the outer short end of said lever and is adapted to contact with a rotating cam 53ᵈ, said cam being secured to the shaft 54ᵉ beneath the lateral arm 54ᵇ of said stand-upright 54ᶠ, a spring 57ᵈ keeping the cam-roller 57ª always in contact with the cam 53ᵈ, (see Figs. 1, 16, 17, and 20,) the function of said clamps being to subcompress the brush-knot end B in the cup 7ᶜ, so that the ferrule 61 may be applied without being interrupted by the brush-stock.

The stand 60 is secured to the table A. To a lateral extension thereof 60ᶠ and brace 60ʰ a ferrule-supplying pipe 60ᵍ is secured, the pipe having a longitudinal slit or peep-opening through a portion of its length, the said pipe being adapted to convey a series of vertically-arranged brush-ferrules 61, which will gravitate loosely through said pipe by their own weight, the ferrules being supplied with an adhesive cement and metallic alloy. A circular ferrule-receiving plate 60ᵇ is pivoted on the shoulder-screw 60ᵈ, which is fastened to the top of the extension 60ª of said stand, a spring 60ᵉ, secured in said extension by the screw 60ᵏ, controlling the inward movements of the receiving-plate 60ᵇ, the said plate being adapted to swing under the supply-pipe and ferrules contained therein and receive and support said ferrules when they are permitted to drop from the supplying-pipe, (see Figs. 1, 16, and 17,) the projection 55ᵉ on the lever pushing the plate 60ᵇ outwardly and from the line of movement of said lever 55.

A cam-roller 55ᵇ is secured to the short outwardly-projecting end of the lever 55. A cam 53ᶜ, secured to the shaft 54ᵉ, is adapted to rotate in operative contact with the said roller 55ᵇ and move said lever and supported parts inwardly toward the shaped, clamped, and trimmed brush-knot in the shaping-cup 7ᶜ, a spring 55ᵍ, secured to the stand projection 53ᶠ, causing the lever and associated parts to recede from the said brush-knot B after the ferrule has been applied.

A ferrule support or "retainer" 63, as I term it, is secured to the top side of the lever extension 55ᵈ and moves therewith, the said retainer being a narrow strip which projects above the ferrule-clamp levers, so that its top side will pass under the bottom ferrule in the supply-pipe 60ᵍ, nearly all of which ferrule is confined within the said supply-pipe, the said ferrule being in this view designated as 61ª. The view in the plan in Fig. 16 shows the retainer 63 as having been advanced by the inward movement of the lever 55, so that it has passed entirely under the ferrule 61ª and beyond the gravitating line thereof, the cement in the ferrule being cut away to show more clearly the position of the ferrule-retainer under said ferrule. The view in Fig. 17, which is a side elevation of Fig. 16, shows the position of the retainer 63 under the ferrule 61ª. Now the ferrule 61, which preceded the retained ferrule 61ª, having been allowed to drop to the ferrule-supporting plate 60ᵇ in the said Fig. 17, the ferrule-clamps 58 58ª are shown as having gripped the supported ferrule and are ready to convey the said ferrule to the brush-knot, as shown in the plan in Fig. 1, the retainer being moved away from under the said ferrule in the outward movement of the lever 55 until it passes beyond the ferrule-supply pipe, and thus permits the next ferrule in line to drop to the ferrule-receiving plate, which has been returned to its position under the ferrule-pipe and ferrules, as in the view in the plan of Fig. 1. In the view in Fig. 17 the ferrule 61 is partly cut away at the top portion, so as to show the position of the retainer 63. The view in the plans in Figs. 1 and 16 does not show the above-described parts so clearly as the view in the elevation Fig. 17.

The stand 65 is secured to the table-top A, said stand being provided with the bearing 69 to support the cam-shaft 30, the stand also having suitable bearings to support devices to apply a conveyed brush-ferrule to a brush-knot and to support devices to eject a brush from the shaping-cup and the machine.

A curved lever 62ª is fulcrumed and moves pivotally on the shoulder-bolt 64, which is secured to the stand 65, the short or lower end of the lever being provided with a cam-roller $62^c$ and adapted to roll against a rotating cam 68, which is secured to the cam-shaft 30. On the top and upper end of the lever a combustion-chamber 62 is secured, said chamber having a gas-burner $62^n$ projecting downwardly therein through the supporting-boss $62^k$ on the top of said chamber, the chamber having a large opening $62^f$ in the front wall thereof. A flexible gas-pipe $62^e$ is secured to the top of said burner and leads the gas into said burner, the holes $62^b$ in the side of the burner $62^n$ supplying air to mix with the gas in its downward flow through the burner-inlet $62^i$, the said chamber-opening $62^f$ also supplying air to support combustion and as means to light the said burner. (See Figs. 21 and 23.) On the bottom of the chamber 62 and projecting centrally therefrom is a brush-adhesive and alloy-melting tool $62^d$ and adapted to be inserted within the brush-ferrule 61, which is supported by the conveying-clamps 58 $58^a$, (see section in Fig. 21,) the said ferrule having therewithin a supply of adhesive cement and metallic alloy and just sufficient to secure a brush-knot. The base $62^o$ of the chamber 62 is used as a means to contact with and press the brush-ferrule 61 down around the brush-knot B until it rests upon the subcompressing-clamps 59 $59^a$, the heat from the melting-tool $62^d$ melting the said adhesive cement or alloy within the ferrule, the melting-tool $62^d$ pressing the fused material $61^c$ $61^b$ down around the brush-knot B, the spring 77, secured to the lever-arm $62^a$ and stand 65, lifting said lever and causing the combustion-chamber and melting-tool $62^d$ to recede upward and away from the ferrule 61. (See Figs. 21, 23, and 28.) The view in Fig. 21 shows the melting-tool $62^d$ in action in the ferrule 61, the cam 68 having actuated the lever $62^a$, thus depressing the chamber and melting-tool and applying said ferrule and melting therein the contents. In Fig. 23 the lever $62^a$, being released from the cam, the spring 77 has lifted the chamber and melting-tool free from said ferrule.

Turning on a shoulder-screw 83 is a brush-ejector lever 71. Secured to said lever and working on said screw is a small plain gear 72, said screw being fastened to the lateral arm 66 of the stand 65. Fulcrumed and moving on the shoulder-screw 74, which is fastened in the lateral arm 75 of said stand 65, is a gear-sector 73, the lower plain end of said sector having a cam-roller 76 affixed thereon and adapted to roll against the cam 70, which is secured to the shaft 30, the said sector 73 intermeshing with and turning the gear 72 and ejector-lever 71. (See Fig. 23.) On the end of the lever 71 is a bell-crank spring-controlled brush-ejector clamp 79, said clamp being pivotally mounted on the shoulder-screw $78^a$, which is fastened to said lever. A spring-supporting pin $81^b$ is secured to the part 78 of the ejector-clamp, said pin working loosely through the lever 71 and supports the clamp-spring 81. (See enlarged view in Fig. 24; see also Figs. 1, 21, and 23.) Three positions are shown of the ejector. The plan in Fig. 1 shows the clamp as having received and gripped the brush, which has been advanced thereto, as indicated by the dotted lines of the clamps and brush-cup. The view in Fig. 21 shows the position occupied by the clamp with the brush clamped therein and ready to be lifted from the cup. The movement described by the ejector and brush is shown by dotted lines in the said view. In Fig. 23 the lever 71 is shown in full lines as having lifted the brush from the cup and carried the same through an orbit, (shown by the dotted line,) the clamp 78 striking a projecting angular boss $67^a$ on the lateral stand-arm 67, the contact opening the clamp 79 and releasing the brush, which may fall into a convenient receptacle, (not here shown,) the spring $66^a$, secured by the screws $65^a$ $65^b$ to the stand and sector, returning the empty clamp to the position shown in Fig. 21. The arm 67 is cut away in the plan in Figs. 1 and 24, but is seen in full in Figs. 21 and 23. The plan of the combustion-chamber is cut away in Figs. 1 and 16, so as to show more clearly the brush-cup and parts as well as the ferrule-conveying devices. In Fig. 22 the plan of the chamber 62 and a part of the lever $62^a$ is shown.

The operation of the machine in detail is as follows: Motion is communicated to the various devices by means of the driving-gear 19, $19^a$, 20, 21, 23, and 24. The eccentric 17 will give a reciprocating movement to the pawl 11, which engaging a tooth of the ratchet will impart an intermittent rotary movement to the ratchet-plate and as said plate is fastened to the vertical shaft 2 will cause this shaft and all parts attached thereto to rotate. The machine being in motion, a supply of bristles is placed by hand in the brush-shaping cup 7, (see Fig. 4,) said cup occupying a point in the front part of the machine, the bristles being further guided and supported by the brush-ring $4^e$. It may be here stated that the brush-shaping cups are all larger than the knot of bristles will be when made up into a brush, the reason for this being to give the bristles freedom to settle in the cup and assume a desirable form or contour on the end. The cup and brush-knot will now be moved around the machine to the point occupied by the cup $7^a$. Now at this point, as well as at all four operative points of the machine—viz., the points occupied by the brush-shaping cups 7 $7^a$ $7^b$ $7^c$—it is desirable to give the knot of bristles B treatment in the several stages necessary to form a brush. These treatments will necessitate a pause in the action of the pawl on the ratchet-wheel. This pause or rest is obtained by the pawl-shifter $44^b$, Figs. 1, 4, 5, 25, and 26, the pawl in its inward movement wiping against the roller $44^b$ and being held there long enough to pass the ratchet-tooth, which it would otherwise engage. In regulating the movement of the shafts 29 and 30 I use a device similar to the one described in my Patent No. 711,065, dated October 14, 1902; but in this machine I only use one worm-gear, 23, the brush-shaping cups and appendages being moved once during a complete revolution of the said gear. The cam $44^a$ on shaft 30, controlling the movement of the pawl-shifter lever 42, will raise the shifter $44^b$ at a period in the revolution of said cam, so as to allow the pawl 11 to drop into and engage a tooth in the ratchet 1. The period during which said shifter is raised will allow the pawl to engage said ratchet twice, and as the ratchet is provided with eight teeth cut equally distant it is obvious that the action of the pawl on the ratchet will move the cups and brush-clamps and brush-knot a quarter-turn only, respectively, from 7 to $7^a$, $7^a$ to $7^b$, $7^b$ to $7^c$, and $7^c$ back to the point 7, where the cup 7 will be free to receive a new supply of bristles B, the shifter dropping in place after the pawl has engaged the two successive teeth in the ratchet and preventing any further movement of said ratchet until the cam $44^a$ in its revolution shall again lift the pawl, allowing same to again engage the teeth thereof, these movements being repeated once during the revolution of the gear 23 on shaft 30, the pause thus secured allowing time for the devices to operate on the bristles in the several cups. (See Figs. 1 and 4.) While the cup $7^a$ is at rest the bristles B confined therein are subjected to a series of vibrating shocks. This is accomplished by the cam-wheel 41, the cams of which wipe against the bottom of the brush-cup stem $1^b$, alternately lifting the said cup. The spring $x^{10}$ drawing the cup down so that the shoulder $2^\times$ of the cup will impinge against the support $2^b$ with a sharp blow or impact, these little and rapid blows will cause the bristles B to settle and assume a shape similar to the interior of the cup's bottom, the brush knot or tuft always being placed in the cups with the "flag" or taper ends down, the root ends extending above the cups, so as to be trimmed, cemented, and bound within a ferrule. The sectional view in Fig. 4 of the brush-shaping cup $7^a$ gives a general idea of the interior of the cup used to form a round "nose" on a brush. It is obvious, however, that the cups can be made of any of the usual shapes of brushes—round, flat, or oval. In either case the brush-clamps would be of the same shape as the cup. The cup $7^a$, with the brush-knot now shaped, will be moved, by the action of the pawl being released, from the shifter to the position occupied by the cup $7^b$. In the movement of the cup from $7^a$ to $7^b$ the knot of bristles B will be subjected to compression by the brush-clamps $6^a$ $6^b$, Fig. 1, the said clamps being closed around the brush-knot 8, said clamps being closed by the roller $9^b$ wiping against the rigid cam 8, the gears $d^2$ $d^3$ acting together, this compression taking place in the movement of the cup $7^a$ away from the cam-wheel 41, the compression being complete before the pawl has made one forward movement of the ratchet, it being necessary to compress the bristles or brush-stock quickly; otherwise they would drop into the larger space of the cup and the previously-formed nose would be ruined, the second engagement of the pawl moving the clamped brush-knot and supporting devices to the position occupied by the cup $7^b$. (See Figs. 1, 4, 12, and 13.) In cupping and shaping the knot of bristles B the outer rows of bristles, by reason of the rounded contour of the interior of the brush-shaping cup, will naturally project above the center of the knot. (See Fig. 4.) It is desirable that these projecting ends, and, in fact, all straggling end, shall be trimmed even with the center of the knot. This is done by means of a brush-shearing device situated in the rear of the machine. The stationary and reciprocating shears 50 $50^d$ oscillating on the plate $50^c$ over the tops of the bristles will shear the top of said knot perfectly even with the center of the knot, the shears being oscillated a number of times over the top of said knot while at rest in the cup $7^b$. In Fig. 1 the shears are shown at one extreme of movement. In Fig. 12 they are shown as being centrally over the brush-knot in cup $7^b$. (See Figs. 1, 4, 12, and 13.) Fig. 12 shows the manner in which the shears operate by shearing all the bristles coming within the shearing-blades 50 and $50^d$, the arrows indicating the direction of movement. The trimmed end of the brush-knot is now moved forward to the position occupied by the cup $7^c$, where an adhesive or alloy charged ferrule 61 will be placed over the brush-knot and the cement in said ferrule melted or fused, so as to envelop and bind the root ends of the brush-knot confined within said ferrule. The application of the ferrule 61 to the bristles B is made by the ferrule-clamps mounted on the swinging lever 55. The ferrules 61, which have been previously supplied with a brush-binding adhesive and metallic alloy of low fusing-point, are placed in the supply-pipe $60^g$, which is of convenient length or height. The ferrules fitting loosely within said pipe will fall by gravity onto the ferrule-plate $60^b$, the supply-pipe having a small longitudinal opening, so as to see the supply of ferrules inside of the pipe. In Fig. 1 the ferrule-clamps are shown as being directly under and in line with the ferrules 61 in the supply-pipe, and the clamps being opened a single ferrule is shown as having dropped into the clamp by reason of ferrule-retainer 63 having passed back beyond the line of the ferrules, the single ferrule being pushed down by the weight of the ferrules above it, the ferrule-plate receiving and holding the ferrule until the clamps 58ª are allowed to close and grip the ferrule, the ferrule-plate being pushed outward and away by the outer end of the lever. (See Figs. 1 and 16.) The conveyed ferrule is next pressed down over the compressed brush-knot until the bottom of the ferrule reaches the clamps 59 59ª, the pressure there ceasing, as that places the ferrule over the brush-knot to the point required. The pressing of the ferrule over the knot is done, as before stated, by the combustion-chamber base 62ᶜ, the melting-tool 62ᵈ at the same time penetrating the interior of the ferrule and contacting with and melting the combination of adhesives contained therein and pressing the same down around the brush-knot end, so that it will envelop the portion of the knot confined within the ferrule and bind it therewithin, the adhesives employed being cement and metallic alloy, either singly or in combination, and is conveniently placed in the ferrules before they are put into the supply-pipe. The brush is then ejected from the cup and machine, the movement of the cup from the ferruling and cement-melting devices bringing the ferrule to the ejector-clamps, which will lift the brush free from said cup and throw it from the machine. The brush-cup now emptied and having been advanced to the starting-point 7 is ready to receive another brush-knot and repeat the operation just described in all of the four cups, so that there will always be one cup to be supplied with a brush-knot, one cup vibrating or shaking and shaping a loose brush-knot, one cup having a clamped, shaped brush-knot being trimmed, and one cup having a ferrule placed over a trimmed brush-knot and having the cement melted thereon, the operations being carried on simultaneously throughout the machine.

Obviously my improved machine may be constructed with a greater or less number of brush-shaping cups and brush-clamps and the shapes and sizes of the cups may be made to conform with the usual or preferred shapes of brushes in use—that is, round, flat, or oval—without departing from the principle of the invention.

Having thus described my invention, what I claim as new, and desire to secure by Letters Patent, is—

1. In a brush-making machine, in combination, a movable brush-shaping cup which is adapted to hold and automatically shape and form a brush-knot; a guiding-stem on the base of said cup, a cup and stem supporting and guiding arm, said arm being provided with a stem hole or bearing; a suitably-mounted rotatable cam-surfaced wheel, said cam-surfaces contacting with and alternately imparting automatic movement to said cup, as means to agitate and shape the brush-knot held therewithin, substantially as set forth.

2. In a brush-making machine in combination, a movable brush-shaping cup, adapted to automatically give shape to the end of a brush-knot, said cup having a guiding-stem projecting centrally from the base thereof; a laterally-projecting cup and stem supporting arm; a rotatable wheel having cam-surfaces thereon, the said cam-surfaces alternately contacting with and lifting said cup-stem and brush-cup and brush-knot confined therein; the cam-shaft 39ᵇ, suitably mounted in the bearing 39 and driven by the intermeshing gears mounted on the stand 40; substantially as set forth.

3. In a brush-making machine in combination a movable brush-shaping cup for shaping a brush-knot, a guiding-stem on said cup, a cup and stem supporting arm bearing, means to lift said brush-shaping cup, said stem having a longitudinal keyway therein, a key in said bearing, said key fitting into said stem-keyway, as means to prevent said stem and brush-shaping cup, from turning sidewise, substantially as set forth.

4. In a brush-making machine, in combination a movable automatic brush-shaping cup, a guiding-stem on said brush-cup, a supporting-arm bearing, said bearing adapted to support on its top side the base of said brush-shaping cup, the said cup-stem being guided through an aperture in said bearing; a key in said bearing, said key fitting into a keyway cut in said guiding-stem, a spring-supporting collar secured to the bottom of said cup-stem, a spring on said guiding-stem between said collar and bearing; substantially as set forth.

5. In a brush-making machine in combination a movable brush-shaping cup which is adapted to automatically shape a brush-knot, a guiding-stem on the base of said brush-cup, an apertured supporting-arm bearing, for said brush-cup and guiding-stem, a spring-supporting collar secured to the outer end of said guiding-stem, a suitably-mounted rotatable cam-wheel, a plurality of cam-surfaces on said wheel, means to rotate said cam-surfaced wheel, a spring on said cup-guiding stem between said supporting-collar and stem-bearing, said rotatable cam-surfaces as means to lift said stem-secured collar, against said retained spring, and as means to lift said brush-shaping cup and brush-knot therewithin from said arm-bearing, said spring as means to return said cup to said bearing and cause a sharp impingement of said brush-shaping-cup base and supporting-arm bearing, thereby agitating and settling the brush-knot confined within said brush-shaping cup; substantially as set forth.

6. In a brush-making machine in combination a movable brush-shaping cup, said cup being adapted to support and automatically shape the end of a brush-knot, a guiding-stem on the base of said cup, a brush-cup and stem supporting and guiding arm, a spring-supporting collar secured to the outer end of said cup-guiding stem, a suitably-mounted rotatable cam-surfaced wheel, a spring on said cup-stem, between said supporting-collar, and cup-supporting arm, said rotatable cam-surfaces and spring as means to impart automatic movement to said brush-shaping cup, said spring as means to cause an impingement of said brush-shaping-cup base, and supporting-arm, as means to agitate and shape the said cup-supported brush-knot, a suitably-supported brush-clamp-supporting arm, a pair of brush-clamps on said arm substantially as set forth.

7. In a brush-making machine in combination a movable brush-shaping cup, which is adapted to automatically shape a brush-knot supported therewithin, a guiding-stem on the base of said cup, a brush-cup and stem supporting and guiding arm, apertured to receive said cup-stem, a laterally-projecting clamp-supporting arm, said cup-supporting arm and clamp-supporting arm, being suitably secured to a rotatable vertical shaft, said shaft being guided in a suitably-supported, overhanging arm bearing a pair of brush-clamping levers and brush-clamps pivotally mounted on shoulder-screws secured to said clamp-supporting arm, gear secured to said clamping-levers and intermeshingly moving with said levers on said shoulder-screws, said brush-clamps adapted to move over and in alinement with said brush-shaping cup, a rigid cam secured to said overhanging shaft-bearing, a cam-roller on one of said clamping-levers, said roller adapted to be advanced to operatively contact with said rigid cam, as means to close said brush-clamps, means to rotate and advance said clamping-levers, and brush-shaping cup, and shaped brush-knot held therewithin such means comprising a rotatable ratchet secured to said shaft, a ratchet-lever, a ratchet-pawl pivotally mounted thereon, a rotatable eccentric, an eccentric-rod moving therewith said rod operatively connected with said ratchet-lever and adapted to move said lever and ratchet and ratchet-shaft substantially as set forth.

8. In a brush-making machine in combination a movable brush-shaping cup a guiding-stem on the base of said cup a cup-supporting arm, apertured to receive said cup-stem, a clamp-supporting arm, a pair of brush-clamping levers, having gears secured thereto, said levers and gears being pivotally mounted on shoulder-screws secured to said clamp-supporting arm, brush-compressing clamps secured to the outer ends of said clamping-levers said clamps as means to embrace and compress a brush-knot supported within said brush-shaping cup, a vertical rotatable shaft, said cup and clamp supporting arms secured thereto, an overhanging shaft-bearing, a rigid brush-clamp closing cam secured thereto, a cam-contacting roller on one of said clamping-levers, a rotatable ratchet, secured to said vertically-supported shaft, means to rotate said ratchet, and cup, and clamp-arm and supporting-shaft, and close said brush-clamp, a rigid brush-guiding ring secured to said clamp-supporting arm; substantially as set forth.

9. In a brush-making machine, in combination a movable brush-shaping cup, a clamp-supporting arm, a pair of clamping-levers pivotally mounted on shoulder-screws in said arm, brush-compressing clamps secured to the outer ends of said levers, said clamps being above said brush-shaping cup and in alinement therewith; a clamp-opening spring secured to the inner ends of said clamping-levers, an overhanging ratchet-shaft bearing, a rigid clamp-cam secured to the under side thereof; a cam-roller on one of said clamping-levers, said roller being adapted to wipe against said cam and close said brush-clamps; a pair of overlapping brush-collecting spurs on each brush-clamp; substantially as set forth.

10. In a brush-making machine, in combination a vertically-supported ratchet-shaft, an overhanging ratchet-shaft bearing, a ratchet secured to said shaft, a ratchet-lever, a pawl pivotally mounted on said ratchet-lever, a retaining-spring attached to said pawl and lever as means to draw the pawl against the teeth of said ratchet; an eccentric-wheel suitably supported and guided, a gear secured therein; a suitably-mounted driving-shaft, a gear on said shaft intermeshing with and turning the gear in said eccentric; an eccentric strap and rod on said eccentric, the ratchet lever and pawl moving on the shoulder-screw secured in said eccentric-rod; substantially as set forth.

11. In a brush-making machine, in combination the overhanging ratchet-shaft bearing, a vertical ratchet-shaft supported in said bearing and in the table-top, a ratchet provided with a hub and secured to said shaft, a ratchet-lever moving on said hub, a pawl moving on said lever, a rotatable eccentric, means to rotate same, a reciprocatable eccentric strap and rod thereon, a ratchet lever and pawl attached to said eccentric-rod and adapted to be reciprocated therewith and move said ratchet and ratchet-shaft; substantially as set forth.

12. In a brush-making machine in combination, a series of movable brush-shaping cups with guiding-stems, a series of laterally-projecting cup and stem supporting and guiding arms, said arms secured to and rotating with a vertical ratchet-shaft; means to support and guide said shaft, a series of pairs of brush-clamps and clamping-levers; a series of clamp-supporting arms secured to and rotating with said ratchet-shaft as means to support said clamps; a series of brush-guiding rings secured to said clamp-supporting arms, a ratchet and ratchet lever and pawl, a spring secured to said lever and pawl and adapted to keep said pawl in operative contact with said ratchet; a rotatable eccentric and means to move same, an eccentric strap and rod on said eccentric, said eccentric-rod attached to said ratchet lever and pawl and adapted to reciprocate said pawl and cause same to turn the said ratchet and all its appendages; substantially as set forth.

13. In a brush-making machine, in combination a movable brush-shaping cup adapted to support and automatically shape a brush-knot, means to support and advance said brush-shaping cup and shaped brush; a pair of brush-clamps and clamping-levers, means to support and advance same, a fixed upright stand an overhanging ratchet-shaft-arm bearing secured to said upright stand, a rigid brush-clamp cam secured to the under side of said shaft-arm bearing, a cam-roller secured to the inner end of one of said clamping-levers, said roller moving in operative contact with a portion of said rigid cam and closing said brush-clamps as means to compress a brush-knot held therebetween; substantially as set forth.

14. In a brush-making machine, in combination a suitably supported and guided brush-shaping cup adapted to hold and shape a brush-knot, means to impart automatic movement to said brush-shaping cup, a brush-knot-guiding ring, said ring being secured to a clamp-supporting arm above and in alinement with said brush-shaping cup; substantially as set forth.

15. In a brush-making machine, in combination an overhanging arm-bearing, a vertical ratchet-shaft supported and guided therein, a ratchet secured to said shaft, a ratchet-lever moving on the hub of said ratchet, a ratchet-pawl moving on said lever, a pawl-retaining spring secured to said pawl and ratchet-lever, an eccentric-rod attached to said ratchet-lever, said eccentric-rod adapted to inwardly reciprocate said ratchet lever and pawl; a pawl-shifting lever pivotally mounted on a fixed stand, a pawl-shifting roller on the end of said shifting-lever; substantially as set forth.

16. In a brush-making machine in combination a rigid pawl-shifting-lever stand, a pawl-shifting lever pivotally mounted thereon, a pawl-shifting roller, on the under inner side of said lever; a cam-roller on the outer end of said shifting-lever, a rotatable cam on the shaft 30, a suitably-mounted ratchet, a ratchet-lever moving on said ratchet, a pawl pivotally mounted on said ratchet-lever and moving therewith, a retaining-spring secured to said pawl and lever, a rotatable eccentric, an eccentric-rod moving reciprocally therewith, said ratchet-lever being pivotally mounted on said eccentric-rod and reciprocating therewith, said ratchet-pawl, operatively contacting in its inward reciprocal movement, with said shifting-roller, and moving out of line of engagement with a tooth of said ratchet, a retaining-spring secured to said shifting-lever and stand as means to keep said shifting-roller in shifting contact with said ratchet-pawl, substantially set forth.

17. In a brush-making machine, in combination, a shifting-lever-supporting stand, a pawl-shifting lever pivotally mounted thereon, a ratchet-pawl-shifting roller secured to the inner under side of said lever and periodically contacting with and shifting said ratchet-pawl; a lever-lifting cam, means to rotate said cam and lift said lever and shifting-roller from operative contact with the said ratchet-pawl; a retaining-spring secured to said lever and supporting-stand; substantially as set forth.

18. In a brush-making machine, in combination, a brush-shaping cup adapted to shape a brush-knot, means to support and advance same, a clamping device for clamping said shaped brush-knot, means to support and advance same; a suitably-mounted driving-shaft, 25, a fixed supporting-stand with a vertical rotating shaft $45^e$, moving in arms in said stand; gears intermeshingly secured to the said shafts, means to actuate same, a gear 46 on said vertical shaft, an eccentric, 48, secured to said shaft, a yoked lever fulcrumed on said stand, said lever-yoke contacting and moving with said eccentric 48; a vertical shaft, 49, moving in the said supporting-stand, a gear 47 on said shaft, said gear intermeshing and turning with the gear 46; an oscillating shear-bearing lever on the shaft 49, a link connecting said shear-bearing lever and said yoked lever, a fixed shear, $50^d$, on said lever, a reciprocating shear, 50, moving in guides in said lever; an eccentric, $49^a$, on the shaft 49, an eccentric strap and rod, said rod attached to and reciprocating said shear 50, over the fixed shear $50^d$, as means to trim the said brush-knot; substantially as set forth.

19. In a brush-making machine, in combination, a movable brush-shaping cup for shaping a brush-knot, a clamping device for clamping said brush-knot, means for supporting and advancing said brush-shaping cup and clamping device, the ferrule-conveying instrumentalities, a fixed supporting-stand, 53, a swinging bell-crank lever, 55, pivotally mounted on a shoulder-screw in said stand; a pair of ferrule-conveying clamps and clamping-levers, gears secured to said clamping-levers, said gears intermeshing and pivotally mounted on shoulder-screws secured in the top side of said lever 55, a cam-roller on the outer end of said lever, a rotatable cam, $53^e$, secured to a vertical shaft, $54^e$, suitably mounted in the stand-arms $54^a$, $54^b$; a suitably-mounted shaft, 30; intermeshing gears secured to said shafts, a lever-spring secured to said stand and keeping said cam-roller in operative contact with said cam; substantially as set forth.

20. In a brush-making machine, in combination a suitably-guided supporting-lever, 55, a pair of brush-conveying clamps and clamping-levers pivotally mounted thereon; a clamp-opening lever, 56, pivotally mounted on the stand 53; a cam-roller on the outer end of said lever, a rotatable cam, 53$^b$, on the shaft 54$^e$, a lever-spring secured to said stand keeping said cam-roller in operative contact with said cam; substantially as set forth.

21. In a brush-making machine, in combination a pair of ferrule-clamping levers, a pair of brush-ferrule-conveying clamps secured thereto, said levers having gears secured thereto and pivotally mounted on the shoulder-screws secured in the top side of the supporting-lever 55; a curved spring-supporting pin secured to one of said levers, said pin moving through an aperture in the opposite lever; a clamp-closing spring supported on said pin and between said levers; a clamp-opening lever 56 suitably guided in the stand 53, a clamp-lever roller on said lever, a cam-roller, 53$^c$, operatively contacting with and inwardly moving said lever 55 and ferrule-conveying clamps; substantially as set forth.

22. In a brush-making machine, in combination the pivotally-mounted supporting-lever, 55, a pair of subcompressing brush-clamp levers, a pair of gears secured to the outer ends thereof, said gears intermeshing and pivotally mounted on the shoulder-screw secured in the said lever 55; a pair of subcompressing brush-clamps secured to the inner ends of said clamp-levers, a clamp-opening spring interposed between said clamp-levers; substantially as set forth.

23. In a brush-making machine, in combination a pair of brush-clamping levers having gears secured thereon, said levers and gears being pivotally mounted on the shoulder-screws on the supporting-lever 55, a clamp-opening spring interposed between said levers, a clamp-closing lever, 57, said lever being pivotally mounted on a shoulder-screw in the stand 53; a clamp-lever roller on the inner end of said closing-lever; a cam-roller on the outer end of said lever, a rotatable cam on the shaft 54$^e$, means to move same; a lever-spring secured to said stand and keeping said cam-roller in operative contact with said cam; substantially as set forth.

24. In a brush-making machine, in combination, a movable brush-shaping cup adapted to hold and shape a brush-knot; means to advance same; a device for clamping the said shaped brush-knot; a pair of brush-clamping levers, subcompressing brush-clamps, secured to the inner ends of said levers a pivotally-mounted clamp-closing lever 57, said clamping-levers pivotally mounted on a swinging lever 55 on the stand 53; means to advance said lever 55 and subcompressing brush-clamps to the said clamped brush-knot; a cam-roller on said clamp-closing lever 57, a spring secured to the stand 53, said spring keeping the said lever 57 in contact with said cam; a clamp-lever roller on the lever 57 contacting with the clamping-lever 59$^c$ and inwardly moving said lever and subcompressing brush-clamp; substantially as set forth.

25. In a brush-making machine, in combination, a movable brush-shaping cup adapted to hold and shape a brush-knot; a brush-knot-clamping device, means to advance said brush-shaping cup, brush-clamping device and shaped brush-knot; a pair of subcompressing brush-clamps, said clamps secured to and pivotally moving with a pair of clamping-levers, means to support and move said clamping-levers and subcompressing clamps to the said shaped and clamped brush-knot; a clamp-closing lever 57, a cam-roller thereon, a rotatable cam operatively contacting with said roller and moving said lever 57 and subcompressing the said shaped brush-knot; substantially as set forth.

26. In a brush-making machine, in combination, a pair of brush-ferrule-conveying clamps guided and supported by the swinging lever 55; means to support and guide said lever; a cam-roller on said lever, a suitably-supported cam in operative contact therewith, means to actuate said cam and lever 55 and brush-ferrule-conveying clamps; a brush-ferrule-supplying pipe, a fixed stand supporting said pipe; substantially as set forth.

27. In a brush-making machine, in combination, a brush-ferrule-supplying pipe, a suitable stand supporting said supplying-pipe, said pipe adapted to hold loosely therewithin a series of vertically-disposed brush-ferrules; a suitably-supported swinging ferrule-receiving plate beneath said supplying-pipe and in alinement therewith; a suitably-secured spring controlling the inward movement of said plate; substantially as set forth.

28. In a brush-making machine, in combination, a ferrule-supplying pipe suitably supported, a ferrule-receiving plate adapted to swing beneath and in alinement with the said supplying-pipe; a swinging lever 55; a projection on the inner portion of said lever, said projection contacting with and moving the said ferrule-receiving plate laterally; means to move said lever; substantially as set forth.

29. In a brush-making machine, in combination, a suitably-supported lever, 55, having a side extension thereon; a ferrule-retainer strip secured to said lever extension; a brush-ferrule-supplying pipe having a series of vertically-disposed gravitating adhesive and metallic alloy supplied, loose brush-ferrules therewithin, means to cause said ferrule-retainer to pass beneath said ferrules, and means to withdraw same; substantially as set forth.

30. In a brush-making machine, in combination a brush-shaping cup for shaping a brush-knot, a clamping device for clamping said brush-knot, means for subcompressing said shaped and clamped brush-knot, and conveying thereto an adhesive and metallic alloy supplied brush-ferrule 61, such means comprising a pivotally-mounted swinging lever; a pair of ferrule-conveying clamps on said lever; a suitable supporting-stand 65; a lever 62ª pivotally mounted thereon, said lever having a combustion-chamber on the inner end thereof, a gas-burner within said chamber, a brush adhesive and metallic alloy melting tool, projecting outwardly from the base of said combustion-chamber, a cam-roller on the outer end of said lever a rotatable cam on the shaft 30, said cam operatively contacting with said roller and moving said lever and combustion-chamber and projecting adhesive and metallic alloy melting tool, substantially as set forth.

31. In a brush-making machine in combination a movable brush-shaping cup said cup adapted to automatically shape and convey a brush-knot a clamping device for clamping said shaped brush-knot, means for supporting and advancing said cup and clamped brush-knot, a pair of ferrule-conveying clamps suitably mounted on a swinging lever, said clamps adapted to convey to said brush-knot an adhesive and metallic alloy supplied ferrule 61, a pair of subcompressing brush-clamps mounted on said swinging lever and moving therewith, a suitably-mounted lever 62ª, a combustion-chamber on the inwardly-extending end of said lever and in alinement with said adhesive and metallic alloy supplied brush-ferrule 61, and brush-knot, a gas-burner projecting downwardly within said burner, means for supplying gas and air thereto, such means comprising a flexible gas-tube leading into said burner, said burner having air-holes leading thereinto, a brush adhesive and metallic alloy melting tool on the outer base of said combustion-chamber substantially as set forth.

32. In a brush-making machine in combination a movable brush-shaping cup adapted to shape and convey a brush-knot, means for advancing same a pair of suitably guided and supported brush-ferrule-conveying clamps, said clamps holding therebetween an adhesive and metallic alloy supplied brush-ferrule 61, a suitably-mounted lever 62ª; a combustion-chamber on said lever a brush adhesive and metallic alloy melting tool, projecting outwardly from said chamber-base, a gas-burner within said chamber and adapted to project a flame against the inner part of said chamber-base, as means to heat said adhesive and alloy melting tool, a rotatable cam operatively moving said lever and chamber with melting-tool thereon, as means to apply said ferrule to said brush-knot and melt the adhesive and metallic alloy within said ferrule, substantially as set forth.

33. In a brush-making machine, in combination, a movable brush-shaping cup adapted to hold and shape a brush-knot, means for supporting and advancing same, means to convey an adhesive and metallic alloy supplied brush-ferrule to said brush-knot a supporting-stand 65, a lever pivotally mounted thereon, a combustion-chamber thereon, a brush-adhesive-melting tool thereon, a gas-burner within said chamber and adapted to project a flame against said chamber-base and heat said melting-tool, a cam-roller on said lever, a rotatable cam operatively contacting with said roller and downwardly pressing said chamber and adhesive-melting tool against said ferrule and applying same to said brush-knot, a lever-lifting spring secured to said lever and to said stand 65; substantially as set forth.

34. In a brush-making machine, in combination, a movable brush-shaping cup having a shaped and clamped brush-knot therein, means for conveying an adhesive and alloy supplied brush-ferrule to said brush-knot, a lever 62ª pivotally mounted on the stand 65, a combustion-chamber on said lever and alloy-melting tool on said chamber, means for applying heat thereto, such means comprising a gas-burner within said chamber and adapted to project a gas-flame against and heat said chamber-base and said melting-tool, means for applying said melting-tool within said ferrule and melting and applying the adhesive and alloy contained therewithin to the ferruled brush-knot; substantially as set forth.

35. In a brush-making machine, in combination, a swinging brush-ejector lever, a gear on one end thereof, said gear and lever turning on the shoulder-screw 83 in the stand 65; an ejector-clamp fulcrumed and moving laterally on said lever; a spring controlling said clamp, a gear-sector fulcrumed and moving on a shoulder-screw in an arm of said stand, said sector intermeshing with said lever-gear and turning said lever; a rotatable cam on the shaft 30, said cam operatively contacting with a roller on said sector as means to move said ejector-lever; substantially as set forth.

36. In a brush-making machine, in combination, a movable brush-shaping cup adapted to shape a brush-knot, a clamping device for clamping said brush-knot, means for applying a ferrule to said clamped brush-knot and melting the adhesive and alloy in said applied ferrule, means for advancing said ferruled brush-knot, such means comprising brush-cup and brush-clamp supporting arms, said arms secured to a vertically-supported shaft a rotatable ratchet secured to said shaft, a ratchet lever and pawl adapted to be reciprocated, a rotatable eccentric an eccentric-rod moving therewith said eccentric and rod, as reciprocating means for said ratchet lever and pawl, a suitably-mounted pawl-shifting roller and lever, means to disengage said shifting-roller and allow said reciprocating pawl to rotate said ratchet and brush-cup and clamped and ferruled brush-knot, a clamp-opening spring on said brush-clamps, an ejector-clamp, a clamp-supporting lever pivotally mounted in the stand 65, a gear secured to said lever, a fulcrumed gear-sector, a rotatable cam in operative contact therewith, an angular boss on an arm of the said stand, said ejector-clamp adapted to contact with and be opened by said boss; substantially as set forth.

37. In a brush-making machine, in combination, a suitably-supported ejector-clamp lever, an ejector-clamp pivotally mounted thereon, said ejector-clamp adapted to clamp a suitably guided and supported ferruled brush-knot, means to lift said ejector-clamp and brush-knot supported therein, such means comprising a gear-sector 73 fulcrumed on an arm in the stand 65, said sector intermeshing with a gear 72 secured to said ejector-clamp lever, and lifting said lever and clamped brush, an angular boss $67^a$ on the stand-arm 67, said boss adapted to intercept said ejector-clamp and open same, as means to release said brush-knot from said ejector, a spring $66^a$ secured to said sector and to said stand as means to return said ejector-clamp to a clamping position for a succeeding brush; substantially as set forth.

In testimony whereof I affix my signature in presence of two witnesses.

JOSEPH F. MUMFORD.

In presence of—
JOHN F. HOY,
JOSEPH F. MAGEE.